United States Patent [19]
Reed

[11] Patent Number: 5,263,757
[45] Date of Patent: Nov. 23, 1993

[54] CARGO BOX FOR INSERTION INTO THE REAR WINDOW OF TRUCKS

[76] Inventor: Floyd W. Reed, P.O. Box 36, Rochford, S. Dak. 57779

[21] Appl. No.: 14,245

[22] Filed: Feb. 5, 1993

Related U.S. Application Data

[63] Continuation-in-part of Ser. No. 801,970, Dec. 3, 1991, Pat. No. Des. 335,116.

[51] Int. Cl.$^5$ .............................................. B60R 11/00
[52] U.S. Cl. .................................... 296/24.1; 296/26; 296/37.1; 296/37.6; 296/37.8; 296/37.16; 296/201
[58] Field of Search .............. 296/37.1, 37.6, 37.8, 296/37.16, 24.1, 26, 166, 201

[56] References Cited

U.S. PATENT DOCUMENTS

| | | | |
|---|---|---|---|
| D. 244,267 | 5/1977 | Ray | D12/16 |
| D. 300,735 | 4/1989 | Thomas | D12/156 |
| 1,028,100 | 6/1912 | DeWolfe | 296/26 |
| 2,633,714 | 4/1953 | Wehby | 62/6 |
| 2,700,196 | 1/1955 | Panhard | 52/400 |
| 2,825,941 | 3/1959 | Lux et al. | 52/2.12 |
| 2,971,794 | 2/1961 | Garcia | 296/26 |
| 3,159,884 | 12/1964 | Hankey | 52/2.12 |
| 3,249,382 | 5/1966 | Swithenbank | 296/24 |
| 3,508,786 | 4/1970 | Colville | 296/24 |
| 3,833,253 | 9/1974 | Butler | 296/165 |
| 4,095,836 | 5/1978 | Pettit | 296/166 |
| 4,429,759 | 2/1984 | Clark | 180/89.14 |
| 4,507,033 | 3/1985 | Boyd | 410/104 |
| 4,681,361 | 7/1987 | Jolley et al. | 296/37.7 |
| 4,892,346 | 1/1990 | Berlin | 296/37.6 |

Primary Examiner—Robert R. Song
Attorney, Agent, or Firm—Peterson, Wicks, Nemer & Kamrath

[57] ABSTRACT

A cargo box (10) for insertion into the rear window (12) of the cab (16) of a pickup truck (14) or the like is disclosed including an annular, flat, mounting plate (34). The outer periphery (36) of the mounting plate (34) is sized and shaped for insertion between the pair of generally straight sides (26, 28) of the U-shaped well (24) of the seal (22) for the rear window (12), with the mounting plate (34) and cargo box (10) being supported as an integral part of the cab (16) by the seal (22). A tubular neck (40) integrally extends between the inner periphery (38) of the mounting plate (34) and the inner periphery of the front end (50) of a storage enclosure (42). The cargo box (10) can be resiliently supported by a support (72) including a rigid bar (74) extending between and supported by the side rails (32) of the truck box (18). A spool-shaped, elastomeric bushing (86) is secured to the rigid bar (74) and abuts with the bottom (46) of the storage enclosure (42). The cargo box (10) can be received in the opening (102) in the front (98) of a topper (94) to allow their simultaneous use on the truck (14). An inflatable, annular boot (104) having U-shaped cross sections can be provided around the topper opening (102) with first and second legs (106) extending on opposite sides of the topper front (98). The boot (104) when inflated in position abuts with and seals with one or both of the mounting plate (34) and the annular-shaped front end (50) of the storage enclosure (42).

21 Claims, 2 Drawing Sheets

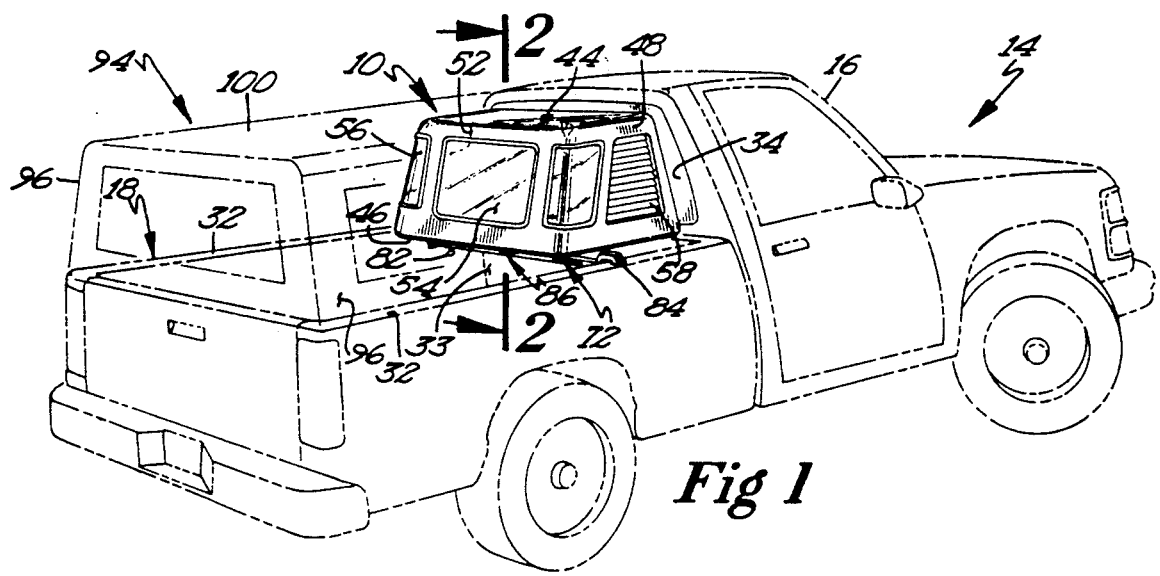
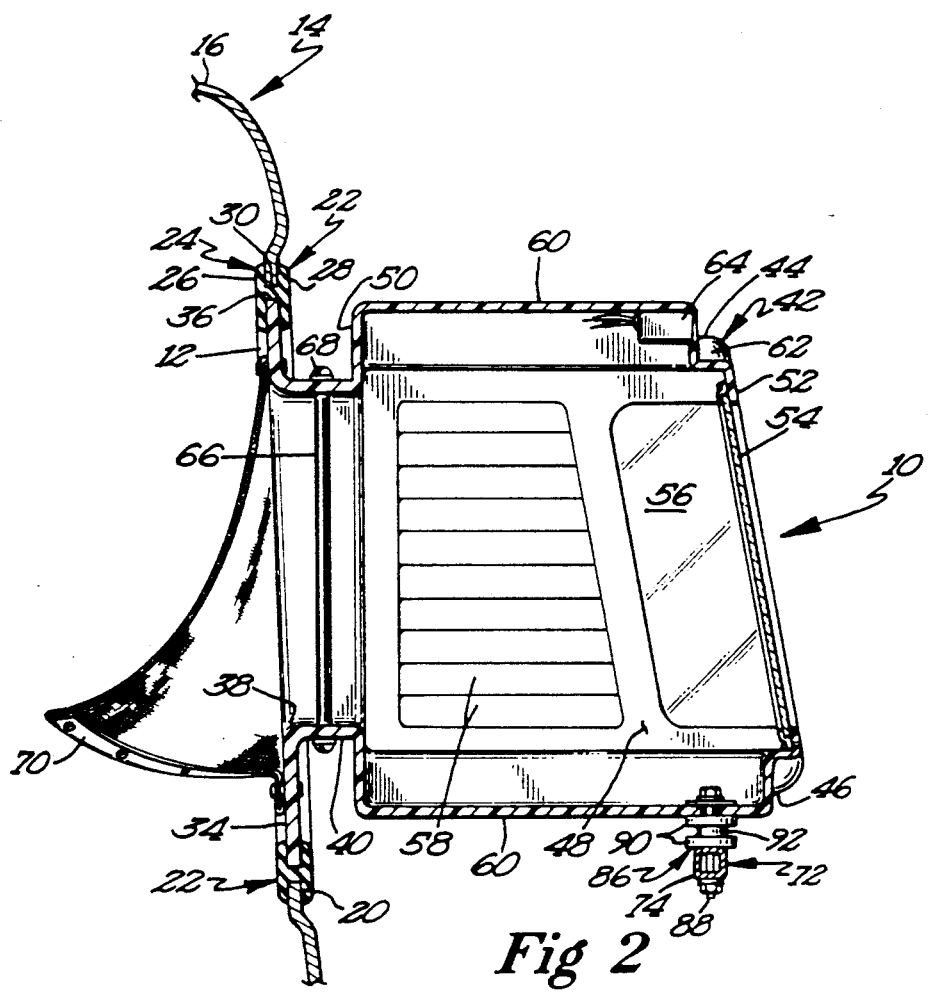

CARGO BOX FOR INSERTION INTO THE REAR WINDOW OF TRUCKS

CROSS REFERENCE

The present application is a continuation-in-part of application No. 07/801,970 filed on Dec. 3, 1991, now U.S. Pat. Des. No. D335,116.

BACKGROUND

The resent invention generally relates to cargo boxes for trucks or the like, particularly to cargo boxes which are accessible from the interior of the cabs of trucks or the like, specifically to cargo boxes which are inserted into the rear window of trucks or the like after its removal and without requiring clamping, drilling or modifying the body portions defining the rear window opening, and more specifically to cargo boxes that can be used with a topper.

Pick-up trucks and the like have limited storage space in the cab. Typically, various objects are placed on the dash of the vehicle and are subject to falling therefrom due to road vibrations or flying therefrom during stopping, with such projectiles being especially dangerous during sudden stopping. One approach to solve this space limitation is to provide storage outside of the cab. Many commercial cargo boxes are available which are supported on the box of the truck. However, as the box and the cab are separate components, twisting and other relative movement occurs therebetween making sealing between the cab and cargo box difficult if not impossible. Typically, access to such cargo boxes was from outside of the cab and/or through a sliding glass rear window of the cab, which is very limited. Also, the presence of such cargo boxes prevented the use of toppers located on the box of the truck.

U.S. Pat. No. 3,249,382 discloses a cargo box which is removably secured in the rear window opening of the cab of the truck by fasteners which extend through holes drilled in the flange of the body portion defining the rear window opening or by C-shaped clamps. Although avoiding many of the shortcomings of box-supported cargo boxes, the cargo box of U.S. Pat. No. 3,249,382 has other deficiencies including the requirement that the body portions defining the window opening be modified or marred, requires the removal of the seal for the window, potentially allowing leakage and making window replacement difficult, and is otherwise difficult to install. As with other existing cargo boxes, the cargo box of U.S. Pat. No. 3,249,382 also does not allow the use of toppers located on the box of the truck.

Thus, a need exists for an improved cargo box which overcomes the shortcomings and deficiencies of prior cargo boxes and which is otherwise advantageous.

SUMMARY

The present invention solves this need and other problems in the field of cargo boxes for pickup trucks and the like by providing, in the most preferred form, a flat mounting plate having an outer periphery of a shape and size corresponding to the bottom of the U-shaped well of the seal and for insertion between the pair of generally straight sides of the U-shaped well of the seal of the rear window of the truck and a storage enclosure secured to and carried by the flat mounting plate, with the storage enclosure being supported as an integral part of the cab outside of the cab and adjacent the rear window by the flat mounting plate supported by the seal secured to the body portion of the truck.

In a further aspect of the present invention, a tubular neck extends between and is secured to the inner periphery of the front end of a storage enclosure and of a flat mounting plate, with the tube and the storage enclosure being supported as an integral part of the cab outside of the cab and adjacent the rear window by the flat mounting plate removably secured in the rear window, with access to the hollow interior of the storage enclosure being allowed through the inner periphery of the flat mounting plate, through the tubular neck, and through the inner periphery of the front end of the storage enclosure.

In another aspect of the present invention, a storage enclosure is resiliently supported by a member secured to the box of the truck while still allowing relative movement of the truck box and the cargo box. In a preferred form, a bushing formed of elastomeric material is mounted to a bar extending between the side rails of the truck box for abutment with the storage enclosure.

In still another aspect of the present invention, a seal provided in the opening of the front of the topper supported by the side rails of the truck box seals with a storage enclosure removably secured in the rear window of the cab and supported as an integral part of the cab outside of the cab and adjacent the rear window and allows relative movement between the cargo box and the topper.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of a cargo box for insertion into the rear window of pick-up trucks or the like according to the preferred teachings of the present invention, with the pick-up truck and topper therefor being shown in phantom.

FIG. 2 shows a cross-sectional view of the cargo box of FIG. 1 according to section line 2—2 of FIG. 1.

Figure 3:
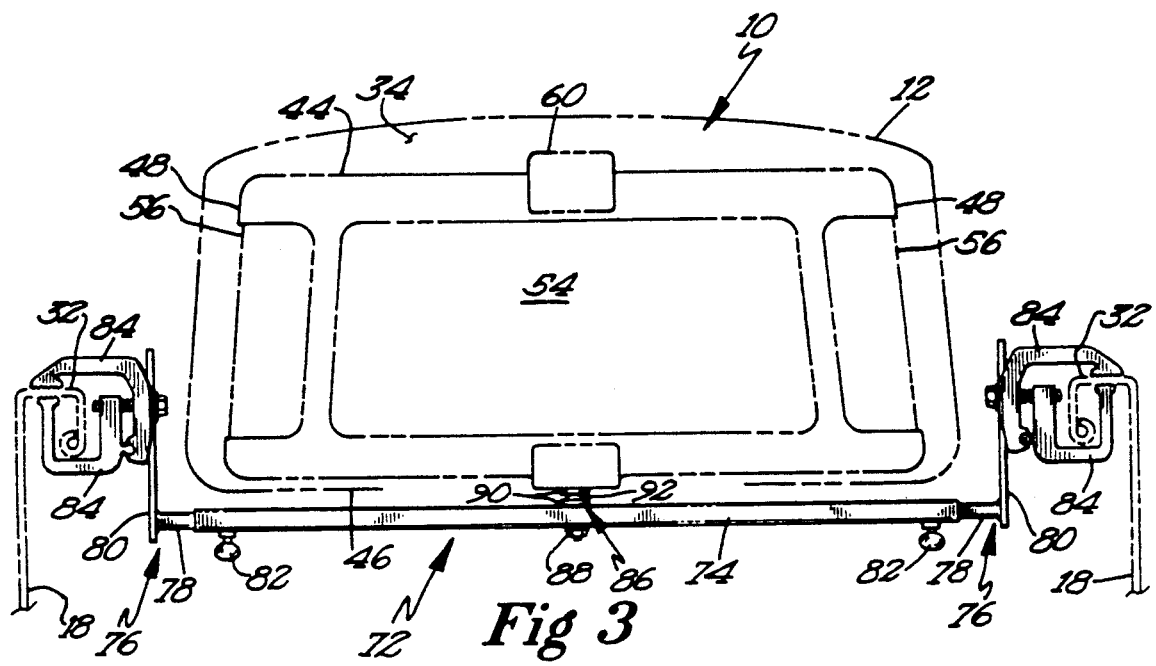
FIG. 3 shows a back view of a support for the cargo box of FIG. 1, with the cargo box and portions of the pick-up truck being shown in phantom.
Figure 4:
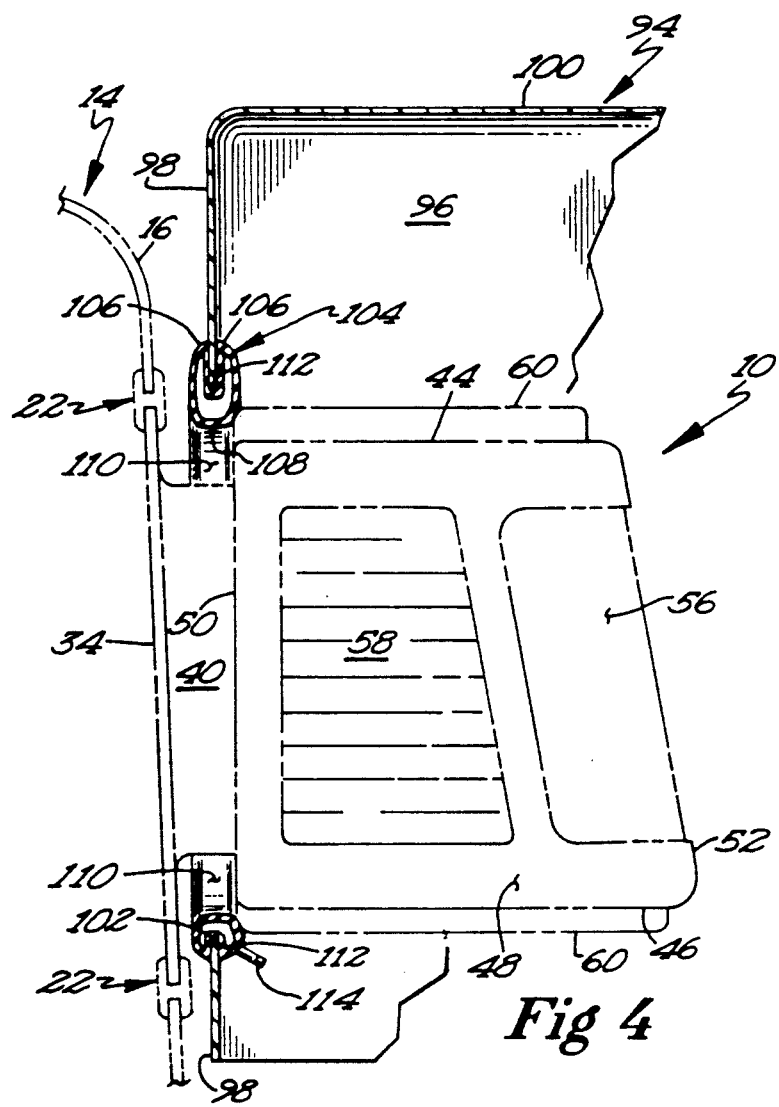
FIG. 4 shows a cross-sectional view of the cargo box of FIG. 1 including a sealing boot for a topper, with portions of the pick-up truck being shown in phantom.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "front", "back", "rear", "upper", "lower", "height", "width", "end", "side", "horizontal", "vertical", "longitudinal", and similar terms are used herein, it should be understood that these terms have reference only to the structure shown in the drawings as it would appear to a person viewing the drawings and are utilized only to facilitate describing the invention.

DESCRIPTION

A cargo box according to the preferred teachings of the present invention is shown in the drawings and generally designated 10. In the most preferred form, cargo box 10 is removably inserted into the rear window 12 of a vehicle such as pickup truck 14 or the like. Particularly, truck 14 generally includes a cab 16 and a box 18 independently mounted to the frame of truck 14. Rear window 12 is formed in cab 16 and is defined by a body portion 20 extending around the periphery of window 12. A window seal 22 is secured to body portion 20 and includes a U-shaped well 24 including a pair of generally straight sides 26 and 28 upstanding on opposite sides of a bottom 30. Seal 22 extends around the entire periphery of window 12 and of body portion 20. A single piece of glass or sliding glass doors are provided in seal 22 when truck 12 is originally purchased from the factory, with such glass or glass doors being removed from seal 22 and window 12 of truck 14 before cargo box 10 of the most preferred form is inserted in window 12. Box 18 includes first and second, spaced parallel side rails 32 extending longitudinally from the back of cab 16 and of window 12 and a front end rail 33 extending between rails 32 and generally adjacent to cab 16 and below window 12.

Cargo box 10 generally includes an annular, flat, planar mounting plate 34 having an outer periphery 36 having a shape and size corresponding to the outer periphery of the glass or glass doors of truck 14 as originally purchased and to bottom 30 of seal 22. Plate 34 has a thickness corresponding to the thickness of the glass or glass doors of truck 14 as originally purchased and to the spacing between sides 26 and 28 of seal 22. It can be appreciated that plate 34 can be originally manufactured at the desired shape and size to fit particular models of trucks 14 and/or can be manufactured in a generic shape and trimmed by the installer of cargo box 10 to fit the specific truck 14 that cargo box 10 is going to be installed into.

Mounting plate 34 has an inner periphery 38 defining the access opening into cargo box 10 of the present invention. It can then be appreciated that inner periphery 38 has a size smaller than outer periphery 36 and than rear window 12.

Cargo box 10 further includes a tubular neck 40 integrally extending longitudinally from plate 34. Neck 40 has a cross sectional shape and size smaller than the shape and size of outer periphery 36 of plate 34 and in the most preferred form corresponds to the shape and size of inner periphery 38 of plate 34.

Cargo box 10 further includes an enclosure 42 having a hollow interior. Generally, enclosure 42 includes a top 44, a bottom 46, first and second sides 48, a front end 50, and a back end 52 integrally connected together. In the preferred form, enclosure 42 is secured to and carried by mounting plate 34 by tubular neck 40. A cross section through top 44, bottom 46, and sides 48 of enclosure 42 is of a shape and size larger than the shape and size of neck 40 and of inner periphery 38 of plate 34 and in the most preferred form smaller than the shape and size of outer periphery 36 of plate 34. In the most preferred form, end 50 is annular shaped having an inner periphery corresponding to inner periphery 38 of plate 34 and of neck 40, with end 50 integrally extending vertically from neck 40 generally parallel to and spaced from plate 34.

In the most preferred form, top 44 has a shape corresponding to the shape of bottom 46 but is slightly smaller. Sides 48 are generally trapezoidal shaped with the major bases extending along the sides of bottom 46. Suitable windows can be provided in enclosure 42, with a rear window 54 being provided in end 52 and first and second corner windows 56 being provided adjacent the intersection of end 52 and sides 48. If desired, window 54 could be of the sliding glass door type. Additionally, sun louvers can be positioned over windows 54 and/or 56 which allow visibility and ventilation while reducing sun passage and adding privacy. In the most preferred form, louvers 58 are provided in sides 48 for aesthetic reasons and for structural strength as will be explained further hereinafter. In the most preferred form, top 44 and bottom 46 can include one or more integrally formed, outstanding channels 60. Channels 60 allow ease of stacking of cargo boxes 10 in inventory and for structural strength as will be explained further hereinafter. In the most preferred form, channels 60 terminate in front of end 52 to define a pocket 62, with suitable signal and/or cargo lights 64 for truck 14 being optionally provided in pockets 62 as desired.

In the most preferred form, plate 34, neck 40, and enclosure 42 are integrally, rotationally molded as a single piece from plastic, fiberglass, or the like. It should then be noted that each of the bends in the material, and particularly at the interconnection of neck 40 to plate 34 and end 50, at the interconnection of top 44 with sides 48 and ends 50 and 52, at the interconnection of bottom 46 with sides 48 and ends 50 and 52, at the interconnection of sides 48 to ends 50 and 52, at louvers 58, at channels 60, and at pockets 62, provides resistance to the bending and/or flexing of cargo box 10 and thus provides structural strength thereto. For additional strength, vertically extending tubular spacers 66 can be provided to extend in the access opening of neck 40, with bolts 68 extending through openings formed in neck 40 and threadably received in spacers 66. While spacers 66 generally do not prevent access to enclosure 42, they do tend to advantageously restrict the size of objects that can be placed in enclosure 42. For example, spacers 66 would tend to prevent a person from crawling into enclosure 42. Suitable means such as a flexible screen or net 70 removably held onto plate 34 such as by snaps can be provided to close off inner periphery 38 of plate 34 and the access opening to cargo box 10 for aesthetic reasons and to retain objects from undesirably traveling forward and out of cargo box 10 while preferably allowing viewing therethrough and through windows 54 and/or 56 from the interior of cab 16.

Now that the basic construction of cargo box 10 according to the preferred teachings of the present invention has been set forth, the installation and subtle features of cargo box 10 can be explained and appreciated. Specifically, the glass or glass doors of rear window 12 of cab 16 is removed from seal 22 in the normal manner with seal 22 intact on body portion 20. Cargo box 10 having plate 34 with outer periphery 36 shaped and sized corresponding to the removed glass or glass doors and to seal 22 is then selected. Plate 34 can then be inserted in seal 22 in the same manner that glass or glass doors are installed in seal 22. It can then be appreciated that cargo box 10 is held in rear window 12 by seal 22 in the same manner that glass or glass doors are held in rear window 12 by seal 22, with plate 34, tubular neck 40, and enclosure 42 being supported as an integral part of cab 16 by seal 22 secured to body portion 20, with tubular neck 40 and enclosure 42 outside of cab 16 and adjacent rear window 12. Thus, several advantages are obtained by cargo box 10 according to the preferred teachings of the present invention. First, cargo box 10 can be installed by the same personnel and technicians that install replacement glass or glass doors in rear windows 12, without requiring any special tools or instructions. Additionally, if desired, cargo box 10 can be removed from rear window 12 with seal 22 remaining intact on body portion 20 and the glass or glass doors can be reinstalled in rear window 12 as desired. Further, since seal 22 remains intact with plate 34 received therein, the problems of leakage of the elements through rear window 12 are avoided, with the presence of cargo box 10 not in any way affecting the existence and performance of seal 22 in truck 14. Furthermore, drilling or modification of body portion 20 or any other portion of cab 16 is not required. Additionally, clamping or other securement devices which can mar or otherwise damage body portion 20 or any other portion of cab 16 are not required.

In the most preferred form, cargo box 10 can be solely supported by seal 22 in rear window 12 and independent of box 18 of truck 14 and will typically support contents over 50 pounds (22 kg) in the interior of cargo box 10 according to the preferred teachings of the present invention under normal conditions. However, if desired, a support 72 can be provided between box 18 and cargo box 10 which allows twisting and other movement of cab 16 and cargo box 10 mounted thereto relative to box 18. Particularly, in the most preferred form, support 72 includes an elongated, rigid bar in the form of a tube 74 having a width generally equal to but less than the width of box 18 of truck 14. First and second L-shaped brackets 76 are provided having first legs 78 slideably received in the ends of tube 74 and having second legs 80. In the most preferred form, tube 74 is square in cross section and legs 78 are also square in cross section of a size generally equal to the inner size of tube 74. Abutment screws 82 are threaded into tube 74 and abut with legs 78 for holding brackets 76 at the desired position relative to tube 74. Suitable clamps 84 or the like are slideably mounted to legs 80 for removable securement to side rails 32 of box 18, with clamps 84 in the preferred form being of the type utilized for holding toppers to boxes 18 of trucks 14. A spool-shaped bushing 86 is suitably secured to tube 74 such as by a bolt 88 extending through tube 74 and threadably received in bushing 86. Bushing 86 has generally circular cross sections including first and second portions 90 separated by a central portion 92. The diameters of portions 90 are greater than the length of the sides of tube 74 and than the diameter of portion 92, with the diameter of portion 92 being generally equal to but slightly larger than the length of the sides of tube 74. Bolt 88 generally extends vertically parallel to and spaced from window 12 and along the diametric centers of portions 90 and 92 and of the spool shape of bushing 86. Bushing 86 is formed of rubber or similar elastomeric material.

In use, support 72 is positioned on box 18 with tube 74 extending between side rails 32 of box 18 and beneath bottom 46 of enclosure 42 of cargo box 10, with bottom 46 being spaced from and generally parallel to tube 74. It should then be noted that adjustment of clamps 84 on legs 80 and of brackets 76 relative to tube 74 allows support 72 to be utilized on various types of trucks 14 such that tube 74 is positioned relative to cargo box 10 according to the height of rear window 12 and thus of cargo box 10 relative to the top of side rails 32 of box 18. Bottom 46 and preferably channel 60 formed thereon abuts with and is supported by the axial end of bushing 86 opposite tube 74. In the most preferred form, bolt 88 extends through bottom 46 and includes a nut which abuts with bottom 46 opposite bushing 86. Although cargo box 10 is supported by support 72 according to the preferred teachings of the present invention, vibrations and other movements subjected to box 18 are isolated from and generally not transmitted to cargo box 10 due to elastomeric bushing 86 between tube 74 and cargo box 10. Particularly, movement is allowed between bushing 86 and cargo box 10 such that box 18 and support 72 can move independently of cab 16 and cargo box 10 without requiring cargo box 10 to move with support 72 and vice versa. Additionally, the spool shape of bushing 86 allows greater flexibility and compressibility of portions 90 to absorb shocks while also assuring that direct contact of tube 74 with cargo box 10 does not occur. It can then be appreciated that the resilient mounting provided by support 72 allows cargo box 10 to be inserted and secured to cab 16 for movement therewith and supported indirectly by box 18 which is independently movable from cab 16 according to the teachings of the present invention. Thus, sealing provided by seal 22 between body portion 20 of cab 16 and cargo box 10 is generally not affected by twisting and other relative movement between cab 16 and box 18.

Toppers 94 are a common option for pickup trucks 14 and generally enclose box 18. Generally, topper 94 includes first and second sides 96 which rest upon and are supported by side rails 32 of box 18, a front 98 which rests upon and is supported by front rail 33 of box 18, and a top 100 extending generally perpendicular to and supported by sides 96 and front 98. It can then be appreciated that front 98 of topper 94 is generally behind and parallel to window 12. Additionally, it should be noted that topper 94 is mounted to box 18 and not to cab 16 and thus moves with box 18 and twists and otherwise moves relative to cab 16. Toppers 94 can come in a variety of types and sizes, but typically sides 96 and cover 100 longitudinally continue the extent of cab 16. Thus, front 98 also has a size at least generally equal to cab 16 above box 18 and larger than rear window 12.

In the most preferred form, tubular neck 40 and enclosure 42 of cargo box 10 according to the teachings of the present invention has cross sections generally parallel to plate 34 of a size and shape smaller than plate 34 and thus of rear window 12 of cab 16 and thus of front 98 of most commercially available toppers 94. It can then be appreciated that if front 98 of topper 94 includes a suitable opening 102 for slideable receipt of storage enclosure 42 and of tubular neck 40, cargo box 10 can be inserted into window 12 as previously set forth, through opening 102 in front 98 and into the interior of topper 94. Thus, cargo box 10 and topper 94 can be simultaneously utilized on truck 14 according to the preferred teachings of the present invention. Opening 102 can either be preformed in front 98 of topper 94 such as that provided for a glass or can be cut in front 98 by the installer of cargo box 10 according to the teachings of the present invention.

A suitable seal 104 can then be provided between cargo box 10 and front 98 of topper 94 to prevent leakage of the elements therebetween. In the most preferred form, seal 104 is in the form of an annular, inflatable boot formed of 24 gauge PVC (polyvinylchloride). Boot 104 has generally U-shaped cross sections including first and second legs 106 extending from a central portion 108. The inner periphery 110 of central portion 108 of boot 104 opposite legs 106 generally corresponds to the shape and size of cargo box 10. The width of inner periphery 110 is in the order of 1¼ inches (3.2 cm). The outer periphery 112 of central portion 108 of boot 104 located intermediate legs 106 generally corresponds to the shape and size of opening 102. The spacing between legs 106 generally corresponds to the thickness of front 98 of topper 94 around opening 102. Legs 106 can have different lengths around periphery 112 for example could be 1 inch (2.5 cm) long on the lower side of boot 104 and 3½ inches (9 cm) on the upper side of boot 104 to accommodate various sizes of openings 102 in toppers 94.

Now that the basic construction of boot 104 according to the preferred teachings of the present invention has been set forth, installation and subtle features of boot 104 can be explained and appreciated. Specifically, boot 104 can be partially inflated such as by air through an air valve 114. At that time, boot 104 can be installed in opening 102 with opening 102 generally abutting with outer periphery 112 and with legs 106 located on opposite sides of front 98 and with central portion 108 located within opening 102. Topper 94 can then be positioned on box 18 of truck 14 and slid into place over cargo box 10. Once topper 94 is in its final position, boot 104 can be fully inflated to seal front 98 and to abut against and seal against cargo box 10. In the most preferred form, opening 102 has a radial extent approximately ½ inch (1.25 cm) larger than enclosure 42 and boot 104 abuts against and seals with one of or both of plate 34 and front end 50, with inner periphery 110 typically being spaced from tubular neck 40. It should be noted that due to the flexible nature of boot 104 from its inflatable construction, cargo box 10 according to the teachings of the present invention can twist or otherwise move with cab 16 and relative to topper 94, with boot 104 changing its shape to conform to the space between opening 102 and cargo box 10 and to maintain a tight sealing relation therebetween.

It can then be appreciated that cargo box 10 including tubular neck 40 according to the teachings of the present invention is particularly advantageous. First, the interconnection of tubular neck 40 with front end 50 of enclosure 42 creates a step in the access opening to the hollow interior of enclosure 42, with such a step providing a stop to prevent heavy objects located in the interior of enclosure 42 from sliding forward out of enclosure 42 through neck 40 and into the interior of cab 16. Tubular neck 40 also allows plate 34 to extend radially therefrom, with plate 34 being easily shapeable to conform to the particular rear window 12 that cargo box 10 is desired to be inserted into. Thus, cargo box 10 can be made of a generic size and specifically is not required to be manufactured to fit specific size and shape of window in a manner as U.S. Pat. No. 3,249,382. Additionally, as tubular neck 40 is smaller than enclosure 42, outer periphery 36 of plate 34 can be shaped to a very small size (smaller than enclosure 42) to fit very small rear windows 12 such as in minipickups to very large rear windows 12 such as in full-size pickup trucks or in trucks. Additionally, tubular neck 40 spaces front end 50 and enclosure 42 from rear window 12 and cab 16 such that abutment therewith is prevented. Additionally, the spacing provided by tubular neck 40 assists the use of cargo box 10 with topper 94 and is especially advantageous in providing the sealing relationship of boot 104 with cargo box 10 according to the teachings of the present invention. Furthermore, as set forth previously, tubular neck 40 provides structural strength to cargo box 10.

Now that the basic teachings of the present invention have been explained, many extensions and variations will be obvious to one having ordinary skill in the art. For example, in the preferred form, bushing 86 is utilized to resiliently support storage enclosure 42 by providing an elastomeric abutment. However, other types and forms of abutment can be utilized according to the teachings of the present invention, such as but not limited to a coil spring which may be of the double-tapered type secured to tube 74 and/or enclosure 42.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Cargo box for insertion in the rear window of a cab of a vehicle such as a truck, with the rear window formed in the cab and defined by a body portion extending around the periphery of the rear window, with the rear window including a seal extending around the entire periphery of the rear window and secured to the body portion including a U-shaped well including a pair of generally straight sides upstanding on opposite sides of a bottom, comprising, in combination: a flat mounting plate having an outer periphery of a shape and size corresponding to the bottom of the U-shaped well of the seal and for insertion between the pair of generally straight sides of the U-shaped well of the seal, with the flat mounting plate being supported as an integral part of the cab in the rear window by the seal secured to the body portion; and a storage enclosure secured to and carried by the fat mounting plate, with the storage enclosure being supported as an integral part of the cab outside of the cab and adjacent the rear window by the flat mounting plate supported by the seal secured to the body portion.

2. The cargo box of claim 1 wherein the flat mounting plate is annular shaped and further includes an inner periphery, with the storage enclosure having an access opening accessible through the inner periphery of the flat mounting plate.

3. The cargo box of claim 1 wherein the vehicle includes a box having side rails extending longitudinally from the cab; and wherein the cargo box further comprises, in combination: means secured to the box of the truck for resiliently supporting the storage enclosure allowing relative movement of the box and the cargo box.

4. The cargo box of claim 3 wherein the resiliently supporting means comprises, in combination: a bar extending between the side rails of the box; and means mounted to the bar for resilient abutment with the storage enclosure.

5. The cargo box of claim 4 wherein the resilient abutment means comprises a bushing formed of elastomeric material.

6. The cargo box of claim 5 wherein the bushing is spool shaped including first and second portions separated by a central portion, with the axis of the spool shape and of the first and second portions extending between the bar and the storage enclosure, with the storage enclosure abutting with one of the axial ends of the first and second portions.

7. The cargo box of claim 1 wherein the vehicle includes a box having side rails extending longitudinally from the cab and a topper supported by the side rails of the box, with the topper including a front having an opening of a size for slideable receipt of the storage enclosure; wherein the cargo box further comprises, in combination: a seal provided in the opening of the front of the topper for sealing with the storage enclosure and allowing relative movement between the cargo box and the topper.

8. The cargo box of claim 7 wherein the topper seal comprises an inflatable, annular boot having generally U-shaped cross sections including first and second legs extending from a central portion, with the central portion located within the opening of the topper and the first and second legs located on opposite sides of the front of the topper, with the central portion abutting with the storage enclosure.

9. The cargo box of claim 8 wherein the flat mounting plate is annular shaped and further includes an inner periphery, with the storage enclosure having a front end of an annular shape including an inner periphery and having a tubular neck extending between the inner periphery of the front end and of the flat mounting plate, with the central portion of the inflatable, annular boot abutting with one or both of the flat mounting plate and the front end of the storage enclosure.

10. Cargo box for insertion in the rear window of a cab of a vehicle such as a truck, with the rear window formed in the cab and defined by a body portion extending around the periphery of the rear window, comprising, in combination: an annular, flat mounting plate having an outer periphery and an inner periphery, with the annular, flat mounting plate being removably secured in the rear window as an integral part of the cab; a storage enclosure having a hollow interior and a front end of an annular shape having an inner periphery; and a tubular neck extending between and secured to the inner periphery of the front end and of the flat mounting plate with the tube and the storage enclosure being supported as an integral part of the cab outside of the cab and adjacent the rear window by the flat mounting plate removably secured in the rear window, with access to the hollow interior of the storage enclosure being allowed through the inner periphery of the flat mounting plate, through the tubular neck, and through the inner periphery of the front end of the storage enclosure.

11. The cargo box of claim 8 wherein the inner peripheries of the flat mounting plate and of the front end of the storage enclosure and cross sections of the tubular neck are smaller than the rear window of the cab.

12. The cargo box of claim 10 wherein the vehicle includes a box having side rails extending longitudinally from the cab; and wherein the cargo box further comprises, in combination: means secured to the box of the truck for resiliently supporting the storage enclosure allowing relative movement of the box and the cargo box.

13. The cargo box of claim 10 wherein the vehicle includes a box having side rails extending longitudinally from the cab and a topper supported by the side rails of the box, with the topper including a front having an opening of a size for slideable receipt of the storage enclosure; wherein the cargo box further comprises, in combination: a seal provided in the opening of the front of the topper for sealing with the storage enclosure and allowing relative movement between the cargo box and the topper.

14. The cargo box of claim 13 wherein the topper seal comprises an inflatable, annular boot having generally U-shaped cross sections including first and second legs extending from a central portion, with the central portion located within the opening of the topper and the first and second legs located on opposite sides of the front of the topper, with the central portion abutting with the storage enclosure.

15. Cargo box for insertion in the rear window of a cab of a vehicle such as a truck, with the vehicle including a box having side rails extending longitudinally from the cab, comprising, in combination: a storage enclosure removably secured in the rear window of the cab and supported as an integral part of the cab outside of the cab and adjacent the rear window; and means secured to the box of the truck for resiliently supporting the storage enclosure allowing relative movement of the box and the cargo box.

16. The cargo box of claim 15 wherein the resiliently supporting means comprises, in combination: a bar extending between the side rails of the box; and means mounted to the bar for resilient abutment with the storage enclosure.

17. The cargo box of claim 16 wherein the resilient abutment means comprises a bushing formed of elastomeric material.

18. The cargo box of claim 17 wherein the bushing is spool shaped including first and second portions separated by a central portion, with the axis of the spool shape and of the first and second portions extending between the bar and the storage enclosure, with the storage enclosure abutting with one of the axial ends of the first and second portions.

19. Cargo box for insertion in the rear window of a cab of a vehicle such as a truck, with the vehicle including a box having side rails extending longitudinally from the cab and a topper supported by the side rails of the box, with the topper including a front having an opening of a size for slideable receipt of a storage enclosure, comprising, in combination: the storage enclosure removably secured in the rear window of the cab and supported as an integral part of the cab outside of the cab and adjacent the rear window; and a seal provided in the opening of the front of the topper for sealing with the storage enclosure and allowing relative movement between the cargo box and the topper.

20. The cargo box of claim 19 wherein the topper seal comprises an inflatable, annular boot having generally U-shaped cross sections including first and second legs extending from a central portion, with the central portion located within the opening of the topper and the first and second legs located on opposite sides of the front of the topper, with the central portion abutting with the storage enclosure.

21. The cargo box of claim 20 wherein the storage enclosure includes an annular mounting plate having an inner periphery and an annular front end having an inner periphery and further includes a tubular neck extending between the inner periphery of the front end and of the flat mounting plate, with the central portion of the inflatable, annular boot abutting with one or both of the flat mounting plate and the front end of the storage enclosure, with access to the storage enclosure being allowed through the inner periphery of the flat mounting plate, through the tubular neck, and through the inner periphery of the front end of the storage enclosure.

* * * * *